US005289758A

United States Patent [19]

Berlinger

[11] Patent Number: 5,289,758

[45] Date of Patent: Mar. 1, 1994

[54] PIN PLUGS FOR USE IN A PISTON ASSEMBLY

[75] Inventor: Willibald G. Berlinger, Peoria, Ill.

[73] Assignee: Caterpillar Inc., Peoria, Ill.

[21] Appl. No.: 878,591

[22] Filed: May 5, 1992

[51] Int. Cl.[5] .................... F16J 1/14

[52] U.S. Cl. .................... 92/190; 92/208; 92/216; 92/219; 74/595; 74/598; 74/579 E; 123/193.6; 403/150

[58] Field of Search .................... 92/172, 208, 212, 216, 92/219, 190, 189; 74/595, 598, 579 E; 403/150; 123/193.6

[56] References Cited

U.S. PATENT DOCUMENTS

| | | | |
|---|---|---|---|
| 1,923,717 | 8/1933 | Frelin . | |
| 2,100,525 | 11/1937 | Sorensen . | |
| 2,383,836 | 8/1945 | Adams . | |
| 2,797,135 | 6/1957 | Johansson . | |
| 3,136,306 | 6/1964 | Kamm | 92/212 X |
| 4,269,083 | 5/1981 | Wandel . | |
| 4,358,881 | 11/1982 | Mahrus et al. . | |
| 4,640,641 | 2/1987 | Edelmayer . | |
| 5,076,149 | 12/1991 | Everts | 92/208 |

FOREIGN PATENT DOCUMENTS

| | | |
|---|---|---|
| 0222359A1 | 5/1987 | European Pat. Off. . |
| 3806929A1 | 9/1989 | Fed. Rep. of Germany . |
| 2225087A | 5/1990 | United Kingdom . |

OTHER PUBLICATIONS

Overhaul Manual-Avco Lycoming-Direct Drive Engine Published by Avco Lycoming Division, Williamsport Pa. 17701 Dec. 1974 Service Table of Limits Part 1 Direct Drive Engines.

*Primary Examiner*—Thomas E. Denion
*Attorney, Agent, or Firm*—Larry G. Cain

[57] ABSTRACT

The design and construction of past piston assemblies having a wrist pin retained by a pair of snap rings positioned in a groove. Other past piston assemblies have a stubpin or cap positioned within a bore of a piston member or the wrist pin. In these applications the stubpin or cap is in continuous contact along the interface between the bore and the stubpin or cap. The present invention provides a device for retaining a wrist pin within a pair of bores of a piston member during operation of an engine. The device includes a shank portion having an outer portion thereon and only the outer portion of the shank portion being in contact with an inner surface of the wrist pin. The device and the wrist pin forming a wrist pin assembly. Thus, the device remains positioned within the inner surface and properly positioned the wrist pin assembly within the bores during operation of an engine within a bore of a cylinder liner. This configuration also increases the contact area between the wrist pin and the piston member increasing the life and dependability of the engine.

13 Claims, 2 Drawing Sheets

10
16
14
32
30
50
26
2
2
28
100
80
34
78
19
76
22
18
20
24
12

PIN PLUGS FOR USE IN A PISTON ASSEMBLY

TECHNICAL FIELD

This invention relates generally to a piston assembly for use in an internal combustion engine, compressor or the like and more particularly to the retention of a piston pin within a piston assembly during operation of the engine.

BACKGROUND ART

The last several years has seen an increasing emphasis being placed on the design of engines to make them more compact, lighter and yet with improved fuel economy, efficiency, reduced emissions, greater service life and increased power output per cylinder. As present day engines are converted or upgraded, the piston assembly is subject to even higher combustion chamber pressures and temperatures.

Attempts have been made to overcome the effects of higher combustion chamber pressures by altering the design of the piston member and its associated components such as the piston pin and the retaining device relative to the piston member. An example is disclosed in U.K. Pat. Application No. GB 2,225,087 published May 23, 1990 to Applicant Metal Leve S. A. Industria E Comerclo. The publication discloses an articulated piston assembly comprised of a head having a pair of pin bosses, a skirt portion and a wrist pin mounted in the bosses and the skirt portion. The assembly further includes a restraining member to prevent lateral deformation of the pin bosses. The bosses are split and are clamped to the pin by means of nuts and bolts. Thus, the pin is prevented from axial movement. Furthermore, the restraining members are in contact with the pin bosses along their entire axial length.

Another example of a piston assembly is disclosed in U.K. Pat. Application 0,222,359 published May 20, 1887 to Applicant AE PLC. The publication discloses an articulated piston assembly comprised of a crown portion having gudgeon-pin bosses, a skirt portion and a gudgeon-pin. A pair of stub-pins are fixedly positioned in the crown portion and prevent axial movement of the gudgeon-pin. The stub-pins are comprised of a plastic material. Furthermore, the stub-pins are in contact with the pin bosses along their entire axial length.

Another example of a piston assembly is disclosed in U.S. Pat. No. 2,797,135 issued Jun. 25, 1957 to J. E. Johansson. The patent discloses a piston assembly comprised of a piston and a tubular gudgeon pin. The pin is retained within the piston by two expansion members consisting of a material having a coefficient of expansion greater than the pin and preferably equal to or greater than the coefficient of expansion of the piston. In this patent the expansion members are positioned within the cylindrical pin. A fastening device axially fixedly positions the pin within the piston. Furthermore, the expansion members are in contact with the cylindrical pin along their entire axial length.

Another example of a piston assembly is disclosed in "Overhaul Manual AVCO Lycoming Direct Drive Engine", the publication is the fifth printing Part No. 60294-7 and is dated in December of 1974. AVCO's Lycoming Division is located in Williamsport, Pa. 17701. The manual on page 1-12 discloses a cylinder, piston and valve components. The pin within the piston assembly is retained in place by a plug positioned in the piston bore similar to the above publication. As shown in the optional example, the plug could be positioned within the cylindrical pin. However, as disclosed the head of the plug is quite long and reduces the surface area between the pin and the piston resulting in high loads being transmitted between the corresponding surface areas of the pin and the piston. Furthermore, the plugs are in contact with the cylindrical pin along their entire axial length.

Another example of a retainer is disclosed in U.S. Pat. No. 1,923,717 issued on Aug. 22, 1933 to Fritjof Frelin. A pair of plugs are threaded onto opposite ends of a sleeve and each has an expandable ring positioned therein contacting and sealing against the surface of a bore through a wrist pin. The head or flange of each plug is larger than the outer diameter of the wrist pin and contacts the piston, thus retaining the wrist pin therebetween. This structure does not permit preassembly of the plugs and wrist pin which can only be assembled at the time of assembling the piston, rod, wrist pin and plugs. Furthermore, the process required to assemble the above components is time consuming, increases cost and increases the total number of parts to be assembled.

In a portion of the above listed publications the restraining members and the stub-pins are positioned within the piston bore through which the gudgeon pin is positioned. In these applications, the surface area of the piston bore is shared by the surface area of the gudgeon pin and the surface area of the restraining members or the stub-pins. Thus, resulting in a higher load being applied to the piston bore surface area and the gudgeon pin surface area. The above listed U.S. patent and the optional example of the manual discloses that expansion members are or can be positioned within the cylindrical pin. Furthermore, most of the disclosures have the retaining members and stub-pins in contact with the mating part along its entire axial length.

The present invention is directed to overcome one or more of the problems as set forth above.

DISCLOSURE OF THE INVENTION

In one aspect of the invention, a piston assembly is comprised of a generally cylindrical main body having a pair of radially inset leg members extending from the main body and being spaced one from the other a preestablished distance. Each of the leg members has a bore positioned therein forming a surface. A generally cylindrical wrist pin is positioned within the bores. The wrist pin further has an outer surface defining a preestablished diameter, an inner surface defining a preestablished diameter and a pair of ends defining a preestablished length. The piston assembly is further comprised of a pair of wrist pin plugs, one of each being positioned at least partially within the inner surface at each end of the wrist pin, forming a wrist pin assembly. The wrist pin plugs include a head portion having a preestablished diameter being less than the preestablished diameter of the outer surface and a preestablished length. The wrist pin plugs further include a shank portion blendingly extending from the head portion. The shank portion defines a wall having a stepped outer surface. The outer surface has an inner portion and an outer portion thereon. The outer portion is the only portion in contacting relationship to the inner surface. The wrist pin assembly is free to move axially within the restraint parameter established by the preestablished diameter of the bore.

In another aspect of the invention, a wrist pin assembly is comprised of a generally cylindrical wrist pin including an outer surface having a preestablished diameter, an inner surface having a preestablished diameter and a pair of ends. The wrist pin assembly is further comprised of a pair of wrist pin plugs, one of each being positioned at least partially within the inner surface at each end. The wrist pin plugs include a head portion having a preestablished diameter being less than the preestablished diameter of the outer surface and a preestablished length. The wrist pin plugs further include a shank portion blendingly extending from the head portion. The shank portion defines a wall having a stepped outer surface. The stepped outer surface has an inner portion and an outer portion thereon. The outer portion is the only portion in contracting relationship to the inner surface.

BEST MODE FOR CARRYING OUT THE INVENTION

Figure 1:
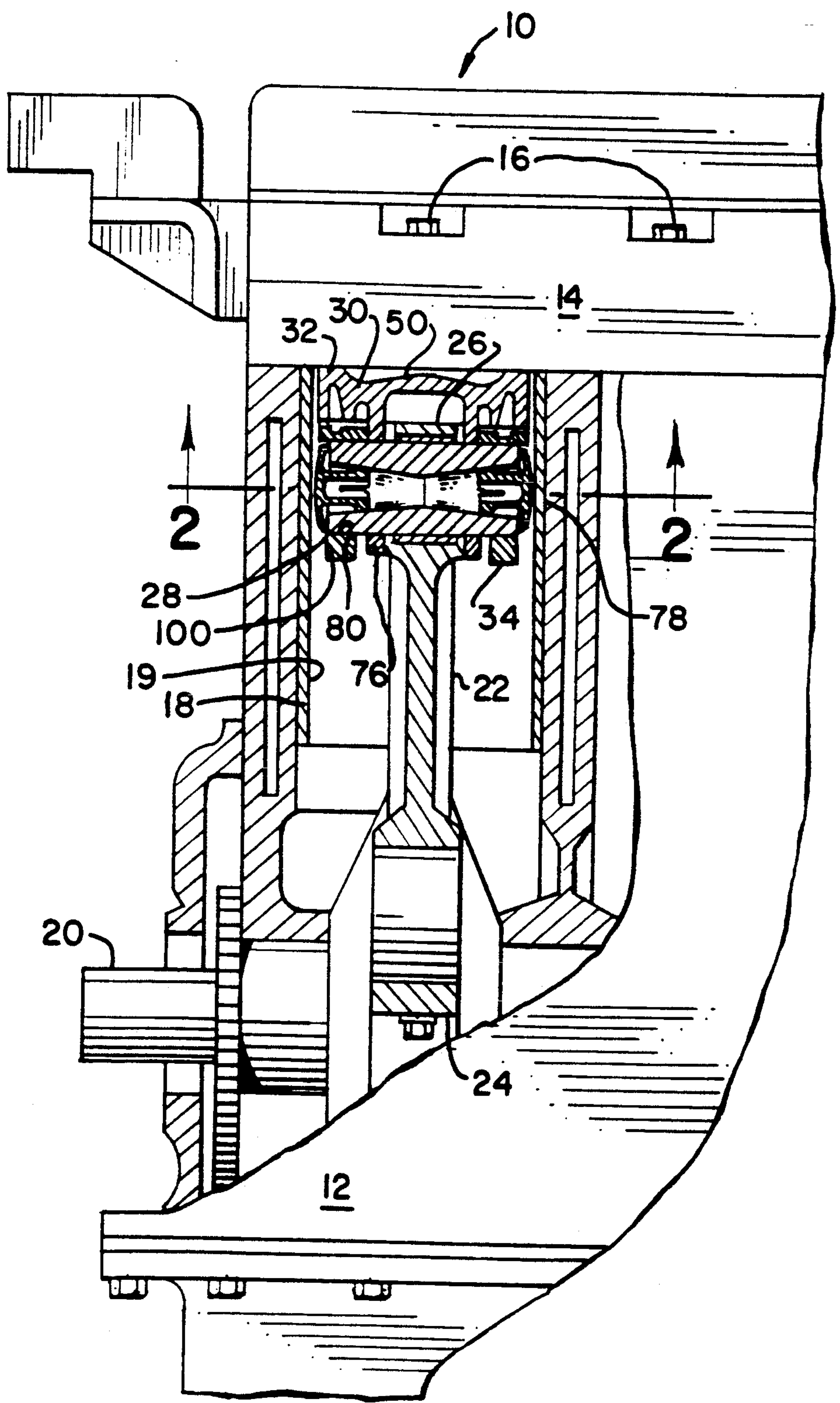
FIG. 1 is a partial side view of an engine embodying the present invention with portions shown in section for illustration convenience.
Figure 2:
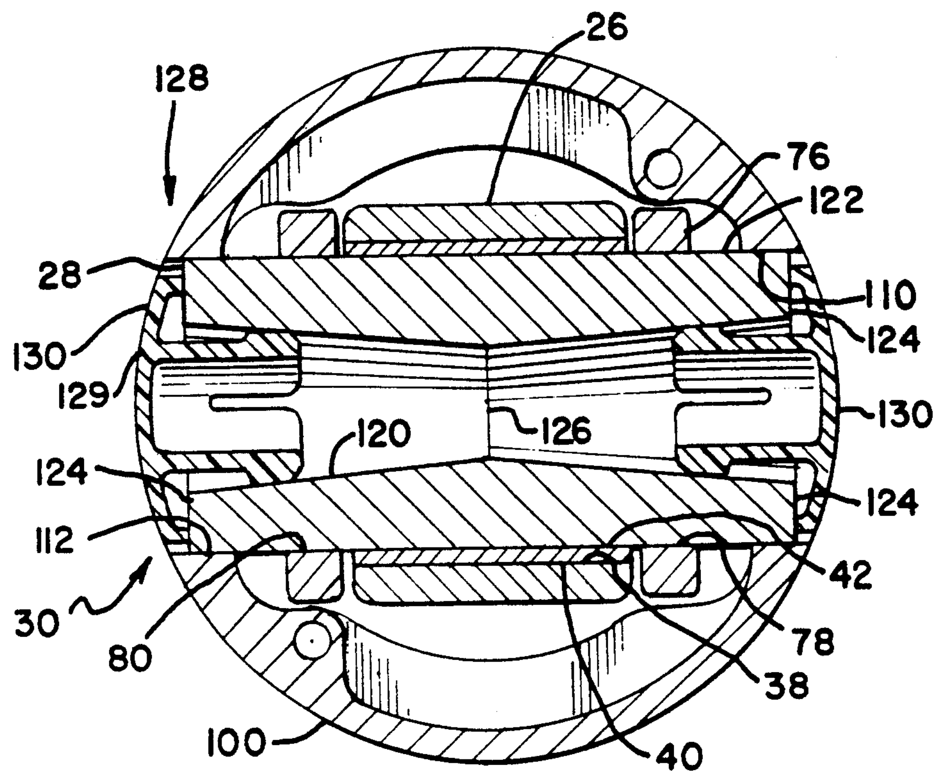
FIG. 2 is an enlarged sectional view of the piston assembly only; the view is taken along line 2—2 of FIG. 1.

Referring to FIG. 1, an internal combustion engine 10 includes a block 12 and a cylinder head 14 rigidly secured to the block 12 by a plurality of fasteners or bolts 16 in a conventional manner. The block 12 includes a plurality of replaceable cylinder liners 18 therein, only one of which is shown. Each of the cylinder liners 18 has a bore 19 therein having a preestablished diameter. The block 12 could include a plurality of machined cylinder bores without changing the gist of the invention. The engine 10 further includes a crankshaft 20 rotatably positioned therein in a conventional manner. A connecting rod 22 is rotatably attached to the crankshaft 20 at a split end 24 in a conventional manner. An upper eye end 26 of the connecting rod 22 is attached to a piston pin or wrist pin 28. The wrist pin 28 is further positioned within a piston assembly 30, as best shown in FIG. 2. In this application the piston assembly 30 is of the articulated type and includes an upper piston member 32 being made of steel or an equivalent material, and a lower piston skirt 34 being made of aluminum or equivalent material which are removably and pivotally mounted on the common wrist pin 28. The piston assembly 30 could be of a single piece design without changing the gist of the invention.

The upper eye end 26 of the connecting rod 22 has a bore 38 therein and a cylindrically shaped steel-backed bronze sleeve bearing 40 is fixedly positioned in the bore 38 and has a inner bore 42 therein which is sized to rotatably accept the wrist pin 28.

The upper piston member 32 includes a generally cylindrical main body 50 and a pair of radially inset leg members 76 which depend from the main body 50. Each of the leg members 76 has a generally circular bore 78 defined therein. Each of the bores 78 form a surface 80 within each of the leg members 76 and are coaxially aligned one to the other. The pair of leg members 76 are spaced a preestablished distance from each other.

The lower piston skirt 34 includes a hollow generally elliptical member 100 having a pair of coaxially aligned bores 110 extending therethrough. Each of the bores 110 form a surface 112 within the skirt 34.

The wrist pin 28, in this application, has a hollow substantially cylindrical configuration being centered about an axis. The wrist pin 28 defines an inner surface 120 having a generally preestablished diameter, an outer surface 122 generally symmetrical about the axis having a preestablished diameter and a pair of ends 124 defining a preestablished length of the wrist pin 28. During the normal manufacturing practice used to make the wrist pin 28, it has been found that the inner surface 120 has a generally tapered configuration. For example, the inner surface 120 has a maximum diameter near the pair of ends 124 and a minor diameter generally intermediate the pair of ends 124. As best shown in FIG. 2, in a somewhat exaggerated form, the inner surface 120 is defined by a pair of tapers extending from each of the pair of ends 124 and termination at an apex 126 near the center interposed the pair of ends 124.

Figure 3:
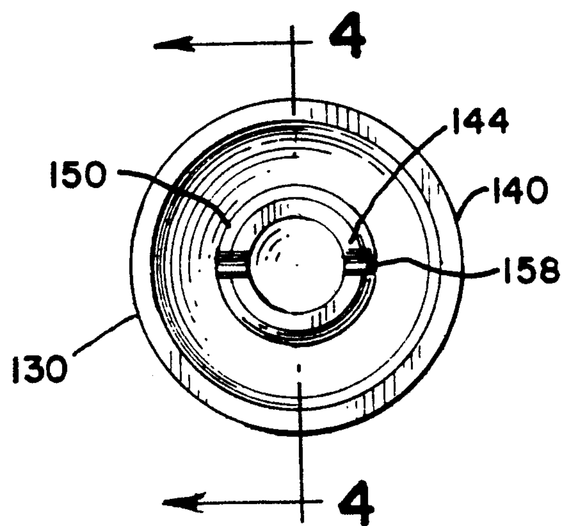
FIG. 3 is an enlarged end view of a wrist pin plug.
Figure 4:
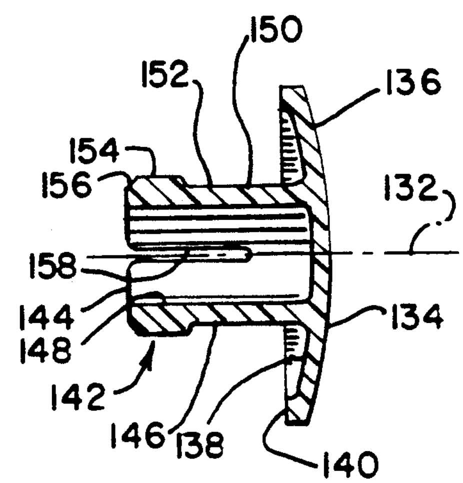
FIG. 4 is an enlarged sectional view of the wrist pin plug taken along line 4—4 of FIG. 3.

As best shown in FIGS. 3 and 4, a means 128 for positioning the wrist pin 28 within the bores 78 in the upper piston member 32 and the pair of bores 110 in the skirt 34 includes a wrist pin assembly 129 having a pair of wrist pin plugs 130 positioned in the wrist pin 28. Each of the plugs 130 has an axis 132 and an impervious head portion 134 having a preestablished diameter less than that of the preestablished diameter of the outer surface 122 of the wrist pin 28. The head portion 134 has a generally convex spherical outer surface 136 and a generally concave spherical inner surface 138. The head portion 134 further has an inner contact surface 140 on the side thereof opposite the spherical outer surface 136. The head portion 134 of each plug 130 has a preestablished length. The preestablished length is measured from the crest of the spherical outer surface 136 to the inner contact surface 140. In this application, the diameter of the head portion 134 is about 47 mm and the length is about 8 mm. The length of the wrist pin assembly 129 includes the preestablished length of the wrist pin 28 added to the preestablished length of each of the head portions 134 of the wrist pin plugs 130. The length of the wrist pin assembly 129 is no greater than the preestablished diameter of the bore 19 within the cylinder liner 18. Each of the plugs 130 further includes a shank portion 142 blendingly extending from the concave spherical inner surface 136, terminating at an end 144 and concentric with the axis 132. The shank portion 142 has a generally cylindrical configuration defined by a wall 146 having an inner surface 148 with a generally constant diameter and a stepped outer surface 150 including an inner portion 152 of a preestablished diameter and an outer portion 154 having a preestablished diameter which is greater than the diameter of the inner portion 152. The inner portion 152 has a preestablished length measured from its intersection with the outer portion 154 to the inner contact surface 140 of the head portion 134. In this application, the diameter of the inner portion 152 is about 24 mm and the length is about 10 mm. The outer portion 154 has a preestablished diameter and a preestablished length measured from its intersection with the inner portion 152 to the end 144. In this application, the diameter of the outer portion 154 is about 28 mm and the length is about 10 mm. Only the outer portion 154 of the plug 130 is in contact with the inner surface 120 of the wrist pin 28 in the installed condition. The outer portion 154 has a chamfer 156 formed thereon at the end 144. It is theorized that if the length of the outer portion 154 is no greater than the preestablished length of the inner portion 152 an appropriate connection and fastening effect will occur between the plugs 130 and the wrist pin 28. Experimentation has found that the position of the outer portion 154 relative to the head portion 134 is critical to effectively retain the plugs 130 within the wrist pin 28. For example, it has been found that the preferred preestablished distance from the head portion 134 to the outer portion 154 is relative to the diameter of the inner surface 120 of the wrist pin 28. The most efficient ratio of the diameter of the inner surface 120 to the length from the head portion 134 to the outer portion 154 or the length of the inner portion 152 is in the range of from about 2:1 to 4:1. The preferred ratio being 3:1. A pair of slots are defined in the wall 146 and extend from the end 144 through the outer portion 154 and into the inner portion 152. The slots 158 have a preestablished width and length, for example, in this application, the width is about 2 mm and the length is about 18 mm. As an alternative, any number of slots and a varied width and/or length could be used without changing the gist of the invention. The wrist pin plugs 130, in this application, are made from a plastic material such as VBRICOMP PDX-J91198. VBRICOMP is a trademark of LNP Engineering Plastic Inc., 475 Creamery Way Exton, Pa. 19341 This material has a range of elasticity which is desirable for this application; however, other material having similar characteristics could be used without changing the gist of the invention.

INDUSTRIAL APPLICABILITY

In this specific example, the piston assembly 30 is of the articulated design and is positioned in the cylinder bore 19 of an engine 10. The piston assembly 30 is assembled prior to assembling in the engine 10. For example, in a subassembly operation one of the wrist pin plugs 130 is inserted into each end of the wrist pin 28. During this operation, the chamfers 156 at the ends 144 of the plugs 130 are positioned in contact with the inner surface 120 of the wrist pin 28 at the opposite ends thereof. As the plugs 130 are forced into the wrist pin 28, the interference fit between the inner surface 120 and the outer portions 154 forces the slots 158 to be reduced in width. Thus, the elasticity of the material from which the plug 130 is made resists the reduction in the size of the slots 158. This resistive force is applied directly to the inner surface 120 by the outer portions 154 and retains the plugs 130 within the wrist pin 28. The 3:1 ratio, of the inner surface diameter of the wrist pin to the length of the inner portion 152 of the plugs 130, is combined with the preestablished diameter and length of the outer portion 154 providing a surface area-to-force relationship which best retains the plug 130 within the wrist pin 28.

During operation of the piston member 30 in the engine 10, the preestablished combined length of the wrist pin 28 and the length of the head portion 134 of each of the plugs 130 retains the wrist pin 34 in proper alignment in the bores 78 in the piston member 32 and the bores 110 in the skirt 34. The wrist pin 28 and the attached plugs 130 are free to move axially within the bores 78 and 110. In operation, the convex spherical outer surface 138 may come in contact with the surface of the bore 19. Experimentation has shown that such contact may result in transfer of material from the plug 130 to the cylinder liner 18. Experimentation has also shown that the transfer of this material does not influence the sealing or wear rate of the piston rings.

The piston assembly 30 of the present invention provides improved serviceability, maintainability and reliability. For example, the 3:1 ratio of the inner surface 120 diameter to the length from the head portion 134 to the outer portion 154 insures a reliable connection between the plugs 130 and the wrist pin 28. Experimentation has shown that even with a tapered contour within the inner surface 120 diameter the plugs 130 will remain in proper position relative to the wrist pin 28. The addition of the slots 158 further add to the stability of the assembly by adding a generally spring effect to the elasticity of the material. Furthermore, the resistive force is applied directly to the inner surface 120 by the outer portions 154 providing a surface area-to-force relationship which best retains the plugs 130 within the wrist pin 28. Additionally, since the wrist pin assembly 129 is free to move axially within the bores 78 in the piston member 32 and the bores 110 within the skirt 34, the axial movement and the sizing between the bores 78 and 110 and the outer surface 122 of the wrist pin 28 insure proper lubrication, cooling and life during operative movement of the components.

Other aspects, objects and advantages of this invention can be obtained from a study of the drawings, the disclosure and the appended claims.

I claim:

1. A piston assembly comprising:

a generally cylindrical main body having a pair of radially inset leg members extending from the main body and being spaced one from the other a preestablished distance, each of said leg members having a bore positioned therein forming a surface;

a generally cylindrical wrist pin positioned within the bores including an outer surface defining a preestablished diameter, an inner surface defining a preestablished diameter and a pair of ends defining a preestablished length;

a pair of wrist pin plugs one of each being positioned at least partially within the inner surface at each end of the wrist pin forming a wrist pin assembly;

said wrist pin plugs including a head portion having a preestablished diameter being less than the preestablished diameter of the outer surface and a preestablished length and said head portion further includes a generally convex spherical outer surface and during operation of said piston assembly within an engine, said outer surface may come in contact with a cylinder bore in which said piston assembly is positioned within;

said wrist pin plugs further including a shank portion blendingly extending from the head portion, said shank portion defining a wall having a stepped outer surface having an inner portion being defined by a preestablished length and an outer portion being defined by a preestablished length thereon, said outer portion being the only portion in contacting relationship to the inner surface and said wrist pin plugs further including a generally concave spherical inner surface and the shank portion blendingly extends from the concave spherical inner surface; and said wrist pin assembly being free to move axially within the bores.

2. The piston assembly of claim 1 wherein said relationship of the preestablished diameter of the inner surface of the wrist pin to the preestablished length of the inner portion of the wrist pin plug is in the range of from about 4:1 to 2:1.

3. The piston assembly of claim 2 wherein said relationship of the preestablished diameter of the inner surface of the wrist pin to the preestablished length of the inner portion of the wrist pin plug is 3:1.

4. The piston assembly of claim 1 wherein said preestablished length of the outer portion is no greater than the preestablished length of the inner portion.

5. The piston assembly of claim 1 wherein said preestablished diameter of the outer portion is larger than the preestablished diameter of the inner surface of the wrist pin.

6. The piston assembly of claim 5 wherein said plug further includes an end and at least one slot axially extending from the end through the outer portion and into a portion of the inner portion.

7. The piston assembly of claim 1 wherein said piston assembly is of articulated piston configuration and includes a main body and a skirt.

8. A wrist pin assembly, comprising;

a generally cylindrical wrist pin including an outer surface having a preestablished diameter, an inner surface having a preestablished diameter and a pair of ends;

a pair of wrist pin plugs one of each being positioned at least partially within the inner surface at each end;

said wrist pin plugs including a head portion having a preestablished diameter being less than the preestablished diameter of the outer surface and a preestablished length and said head portion further includes a generally convex spherical outer surface and during operation of said piston assembly within an engine, said outer surface may come in contact with a cylinder bore in which said piston assembly is positioned within; and said wrist pin plugs further including a generally concave spherical inner surface and a shank portion blendingly extending from the concave spherical inner surface, said shank portion defining a wall having a stepped outer surface having an inner portion being defined by a preestablished length and an outer portion being defined by a preestablished length thereon, said outer portion being the only portion in contacting relationship to the inner surface.

9. The wrist pin assembly of claim 8 wherein said relationship of the preestablished diameter of the inner surface of the wrist pin to the preestablished length of the inner portion of the wrist pin plug is in the range of from about 4:1 to 2:1.

10. The wrist pin assembly of claim 9 wherein said relationship of the preestablished diameter of the inner surface of the wrist pin (28) to the preestablished length of the inner portion of the wrist pin plug is 3:1.

11. The wrist pin assembly of claim 8 wherein said preestablished length of the outer portion is no greater than the preestablished length of the inner portion.

12. The wrist pin assembly of claim 8 wherein said preestablished diameter of the outer portion is larger than the preestablished diameter of the inner surface of the wrist pin.

13. The wrist pin assembly of claim 12 wherein said plugs further include an end and at least one slot axially extending from the end through the outer portion and into a portion of the inner portion.

* * * * *